(12) United States Patent
Wittig

(10) Patent No.: US 9,476,781 B2
(45) Date of Patent: Oct. 25, 2016

(54) SENSOR DEVICE AND DEPOSITION DEVICE HAVING A SENSOR DEVICE

(71) Applicant: WÜRTH ELEKTRONIK ICS GmbH & Co. KG, Öhringen (DE)

(72) Inventor: Klaus Wittig, Öhringen/Kappel (DE)

(73) Assignee: WÜRTH ELEKTRONIK ICS GMBH & CO. KG, Öhringen (DE)

( * ) Notice: Subject to any disclaimer, the term of this patent is extended or adjusted under 35 U.S.C. 154(b) by 187 days.

(21) Appl. No.: 14/195,340

(22) Filed: Mar. 3, 2014

(65) Prior Publication Data
US 2014/0245841 A1 Sep. 4, 2014

(30) Foreign Application Priority Data

Mar. 3, 2013 (DE) .................. 10 2013 004 031

(51) Int. Cl.
| | |
|---|---|
| *G01L 1/14* | (2006.01) |
| *G01L 1/26* | (2006.01) |
| *G06Q 10/08* | (2012.01) |

(52) U.S. Cl.
CPC . *G01L 1/14* (2013.01); *G01L 1/26* (2013.01); *G06Q 10/087* (2013.01)

(58) Field of Classification Search
CPC ............ G01L 1/14; G01G 3/13; G01G 3/14; G01G 3/1402; G01G 3/1406; G01G 3/1416; G01G 3/1418; G01G 3/18; G01G 21/28
USPC ..................................... 73/273, 201, 862.68
See application file for complete search history.

(56) References Cited

U.S. PATENT DOCUMENTS

| | | | | |
|---|---|---|---|---|
| 4,821,584 A | * | 4/1989 | Lembke ................. | B25J 19/063 310/338 |
| 6,999,301 B1 | * | 2/2006 | Sanftleben ......... | G01G 19/4142 340/438 |
| 7,434,481 B2 | * | 10/2008 | Hawes ................... | B60N 2/002 177/136 |
| 8,168,935 B2 | * | 5/2012 | Daiku ..................... | G01L 1/247 235/454 |
| 8,186,233 B2 | * | 5/2012 | Joung ..................... | G01L 1/205 73/862.68 |
| 8,258,799 B2 | * | 9/2012 | Bernstein .................. | F41H 1/02 324/525 |

* cited by examiner

*Primary Examiner* — Lisa Caputo
*Assistant Examiner* — Tran M Tran
(74) *Attorney, Agent, or Firm* — The Concept Law Group, P.A.; Scott D. Smiley; Yongae Jun

(57) ABSTRACT

A deposition device includes a deposition container with an intermediate plate, a sensor mat positioned on the deposition container, where the sensor mat includes at least two locating recesses for positioning the sensor mat within an area of a maximum permissible movement, and at least one detection sublayer. The intermediate plate includes at least one passthrough opening to allow an electrical connection device connected to the sensor mat to pass through, so that the sensor mat can be connected to a circuit board disposed in an electronics container space. The intermediate plate further includes locating pins arranged on the intermediate plate and protruding into a locating recess. The cross section of the locating pins is such that over the entire length thereof the locating recess permits local movability of the sensor mat in all directions in the planar extension thereof, within the maximum permissible range of movement.

21 Claims, 17 Drawing Sheets

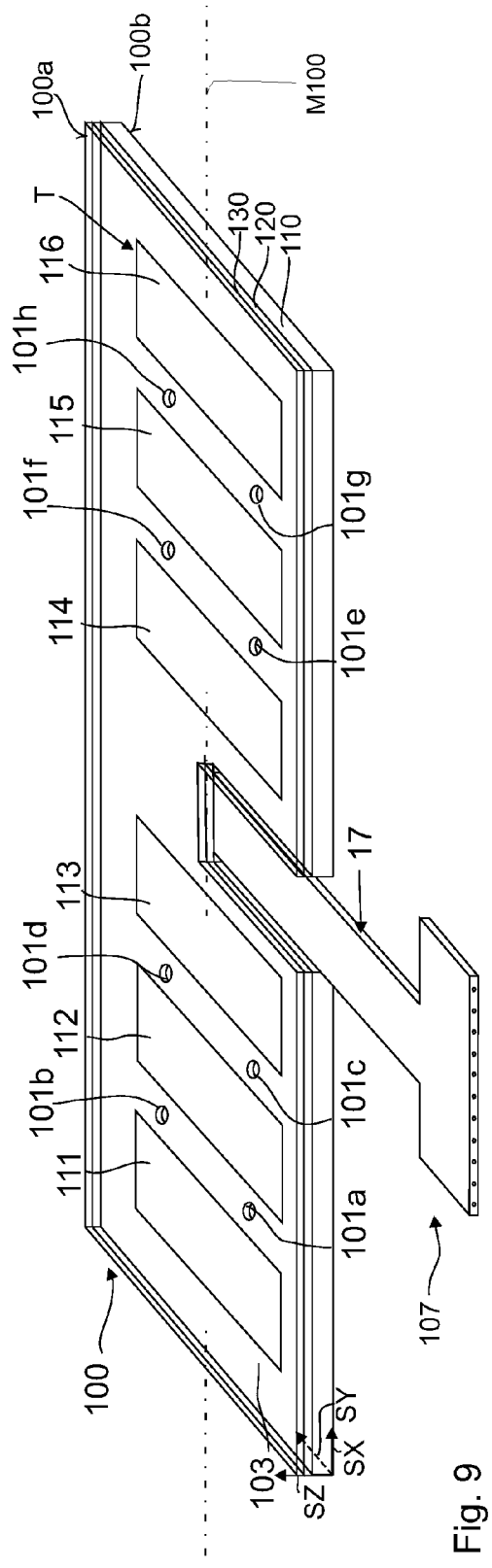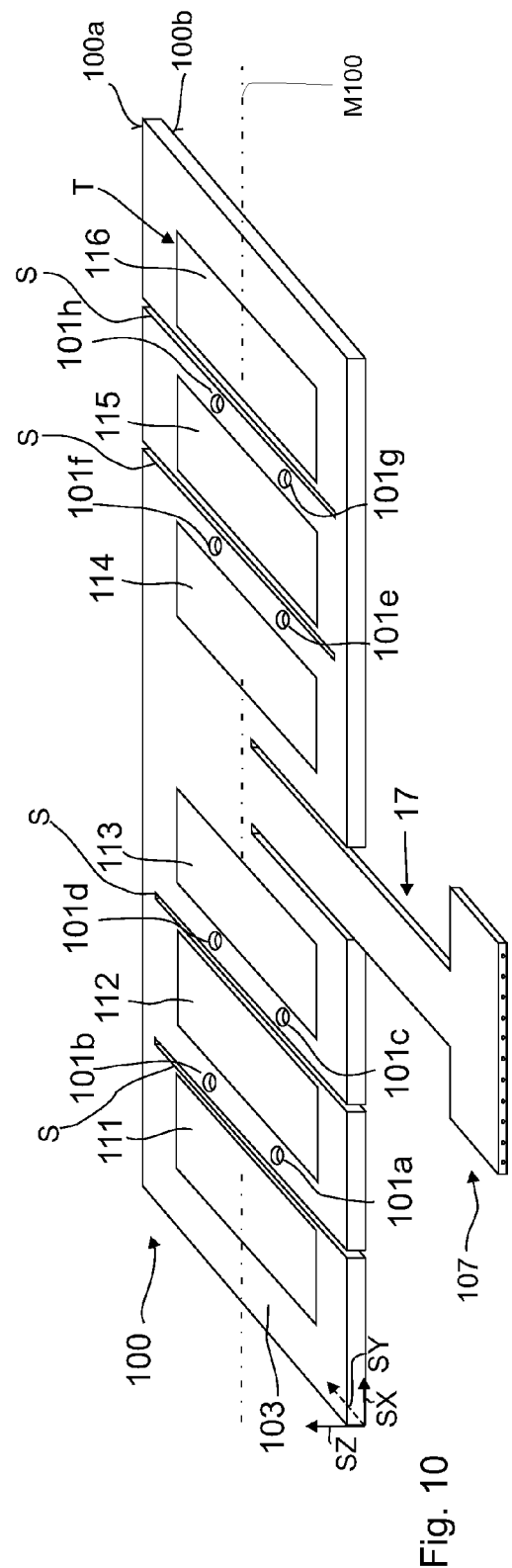

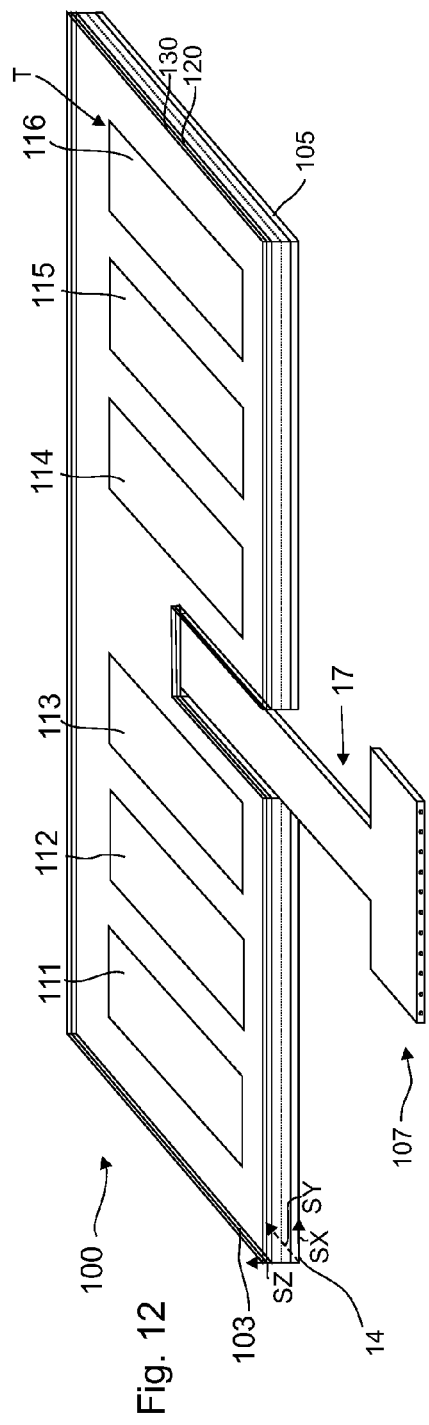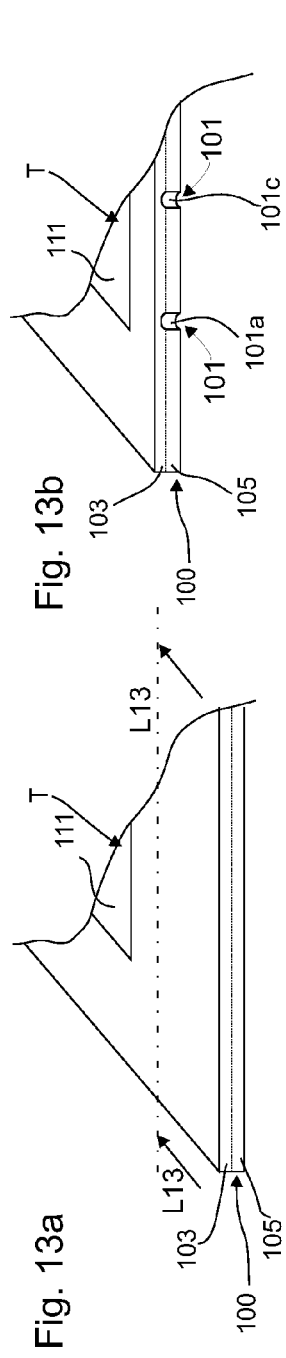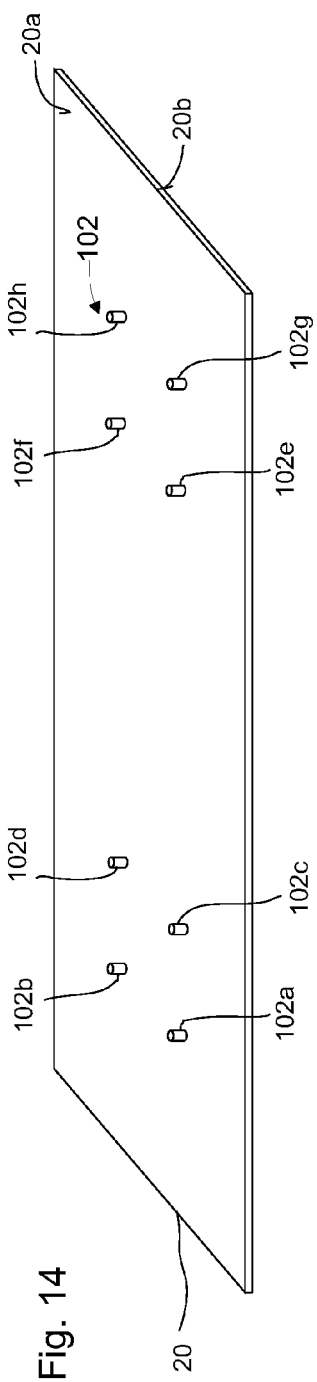

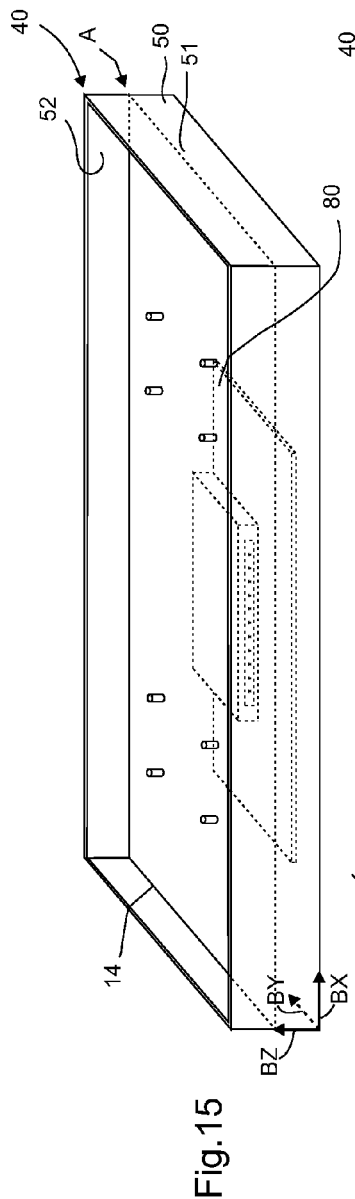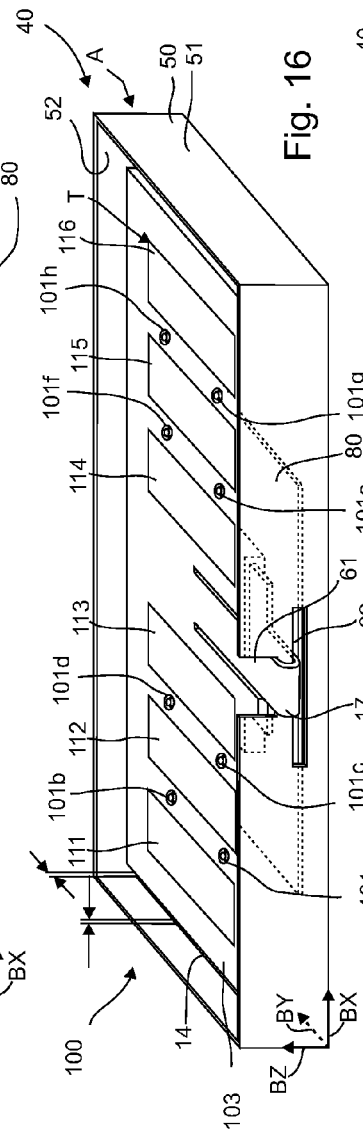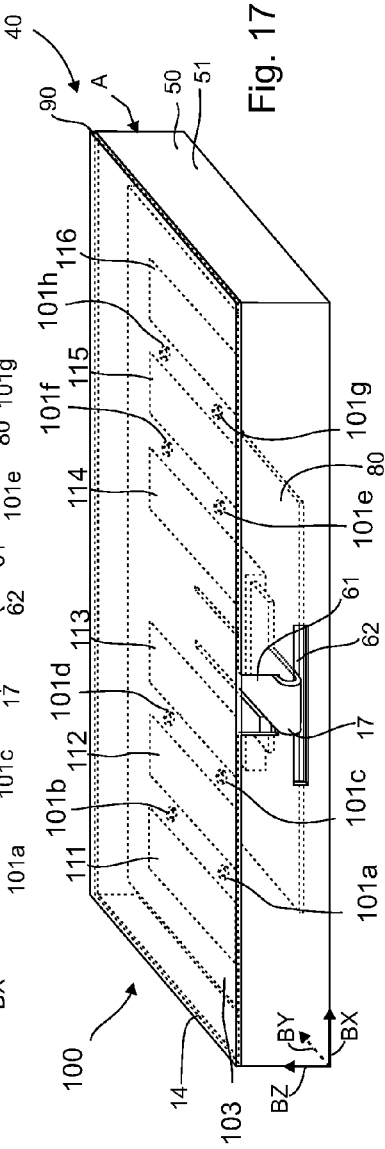

SENSOR DEVICE AND DEPOSITION DEVICE HAVING A SENSOR DEVICE

FIELD OF THE INVENTION

The present invention relates generally to sensors, and more particularly relates to a sensor device and a deposition device having a sensor device.

BACKGROUND OF THE INVENTION

Deposition devices for depositing objects having a flat, pressure-sensitive sensor device for capturing the deposition of objects on the deposition device are known from the general prior art. They have not been adapted to specific application environments.

SUMMARY OF THE INVENTION

The object of the invention is to provide a sensor device for capturing the deposition of objects over an area, and a deposition device equipped with such a sensor device, which is usable to an advantage in refrigerators in each case.

This object is solved with the features of the independent claims. Additional embodiments of the invention are described in the claims dependent, respectively, on each of the independent claims.

According to one aspect of the invention, a sensor device is provided, including a base plate, a sensor plate positioned on the base plate, wherein the sensor plate has: at least one locating recess for positioning the sensor plate within an area of maximum permissible movement on the base plate; at least one detection sublayer; and one connection device for connecting the sensor plate electrically to an evaluation device; wherein the base plate comprises at least one locating lug, the lengthwise direction of which projects away from the base plate in a direction perpendicular to a major surface of the sensor device and the locating lugs are arranged on the base plate and are of such construction that each locating lug protrudes into a locating recess, the cross section of the lugs being such that, over the entire length thereof, the locating recess permits local movement of the sensor plate in all directions in a planar extension thereof, within a maximum permissible range of movement.

According to another embodiment of the sensor device, it is provided that the connection device comprises a ribbon cable and a plug device arranged thereon for plugging into a connection device of the evaluation device.

According to another embodiment of the sensor device, it is provided that the connection device comprises a plug device conformed directly on the sensor plate for plugging into a connection device of the evaluation device.

According to another embodiment of the sensor device, it is provided that the sensor plate includes of a base plate, a separator layer disposed thereon, and a conductor layer disposed on the separator layer.

According to one aspect of the invention, a deposition device is provided that comprises: a containing device having a bottom plate and a base plate located above the bottom plate in the direction perpendicular to the major surface of the containing device, a peripheral side wall that laterally delimits an electronics container space located between the bottom plate and the base plate and extends from the base plate to create a lateral delimitation of a sensor container space located above the base plate; and a sensor plate located on the base plate, wherein the sensor plate comprises at least two locating recesses for positioning the sensor plate within a maximum permissible range of movement, and at least one detection sublayer. The base plate or the side wall has at least one passthrough opening through which an electrical connection device connected to the sensor plate is routed to enable a connection between the sensor plate and an evaluation device or conductor plate arranged in the electronics container space. Furthermore, the base plate comprises at least one locating lug, which projects lengthwise away from the base plate in the direction perpendicular to the major surface of the containing device, wherein the locating lugs are arranged on the base plate in such manner and are constructed in such manner that each locating lug protrudes into one locating recess, and the cross section of the lugs is such over the entire length thereof the locating recess permits local movement of the sensor plate in all directions in the planar extension thereof, within a maximum permissible range of movement, and the planar extension of the sensor plate is configured in such manner that in order to prevent the lateral edge thereof from coming into contact with the side wall due to thermal expansion of the sensor plate, the surrounding lateral edge is located at a predefined minimum distance from the side wall.

According to a further embodiment of the deposition device, it is provided that each of the at least two locating lugs is cylindrical in shape.

According to a further embodiment of the deposition device, in this context it is provided that the locating lugs are constructed integrally with the base plate.

According to a further embodiment of the deposition device, it is provided that each of the at least two locating recesses has a circular or cylindrical cross section.

According to a further embodiment of the deposition device, it is provided that the sensor plate comprises a baseplate and at least one pressure-sensitive detection sublayer integrated in the sensor plate.

According to a further embodiment of the deposition device, in this context it is provided that the sensor plate comprises at least two pressure-sensitive detection sublayers integrated in the base plate, and the sensor plate is furnished with slits that extend from one lateral edge of the base plate over more than half of the portion of the sensor plate that is located between the detection sublayers.

According to a further embodiment of the deposition device, in this context it is provided that the sensor plate is constructed from a support plate and the base plate, with a lower plate being furnished with the locating recesses, and locating lugs only extending inside the support plate.

According to a further embodiment of the deposition device, in this context it is provided that the locating recesses are only formed in the lower plate, and the locating lugs only extending inside the locating recesses. The base plate or the lower plate may be of a rigid construction.

According to a further embodiment of the deposition device, it is provided that each of the pressure-sensitive detection sublayers has two interlocking, crenellated foils which are positioned in the respective detection sublayers to ensure that the sublayers are electrically connected as a capacitor, and which may be electrically connected as capacitors.

According to a further embodiment of the deposition device, it is provided that the covering device covers the sensor plate, and the covering device is disposed on the sensor plate or on an upper edge surface of the side wall.

According to a further embodiment of the deposition device, in this context it is provided that the covering device has the form of a covering film or a flexible cover plate.

According to a further embodiment of the deposition device, it is provided that the containing device has a ledge that extends around the inner surface of the side wall, and on which the base plate is supported.

According to a further embodiment of the deposition device, it is provided that the containing device and the base plate are manufactured as a single unit.

According to a further embodiment of the deposition device, it is provided that the passthrough opening is furnished with an edge recess on one edge section of the side wall.

According to a further embodiment of the deposition device, it is provided that the passthrough opening is furnished with a window recess in the side wall.

According to a further embodiment of the deposition device, it is provided that the passthrough opening is furnished with an edge recess on an edge portion of the base plate.

BRIEF DESCRIPTION OF THE DRAWINGS

In the following, embodiments of the invention will be described with reference to the accompanying figures, in which:

FIG. 9 is an assembled perspective view of the sensor device of FIG. 1 in the assembled state;

FIG. 10 is a perspective view of an embodiment of the sensor plate which, unlike the embodiment shown in FIGS. 1 to 9, is furnished with slits extending between the detection sublayers;

FIG. 12 is a perspective view of a further variant of the sensor plate;

FIG. 13a is a perspective view of an embodiment of a portion of a sensor plate;

FIG. 13b is a a cross section view of the portion of the sensor plate of FIG. 13a, along line L13-L13 in FIG. 13a;

FIG. 14 is a perspective view of an embodiment of the base plate;

FIGS. 15 to 17 show various stages of assembly of the deposition device of FIG. 1 with a base plate according to FIG. 14, wherein a cover film is placed on top of it;

In the figures, components or features of the objects represented that have equivalent or identical functions to each other may be identified with the same reference sign in different figures.

DETAILED DESCRIPTION

Figure 3:
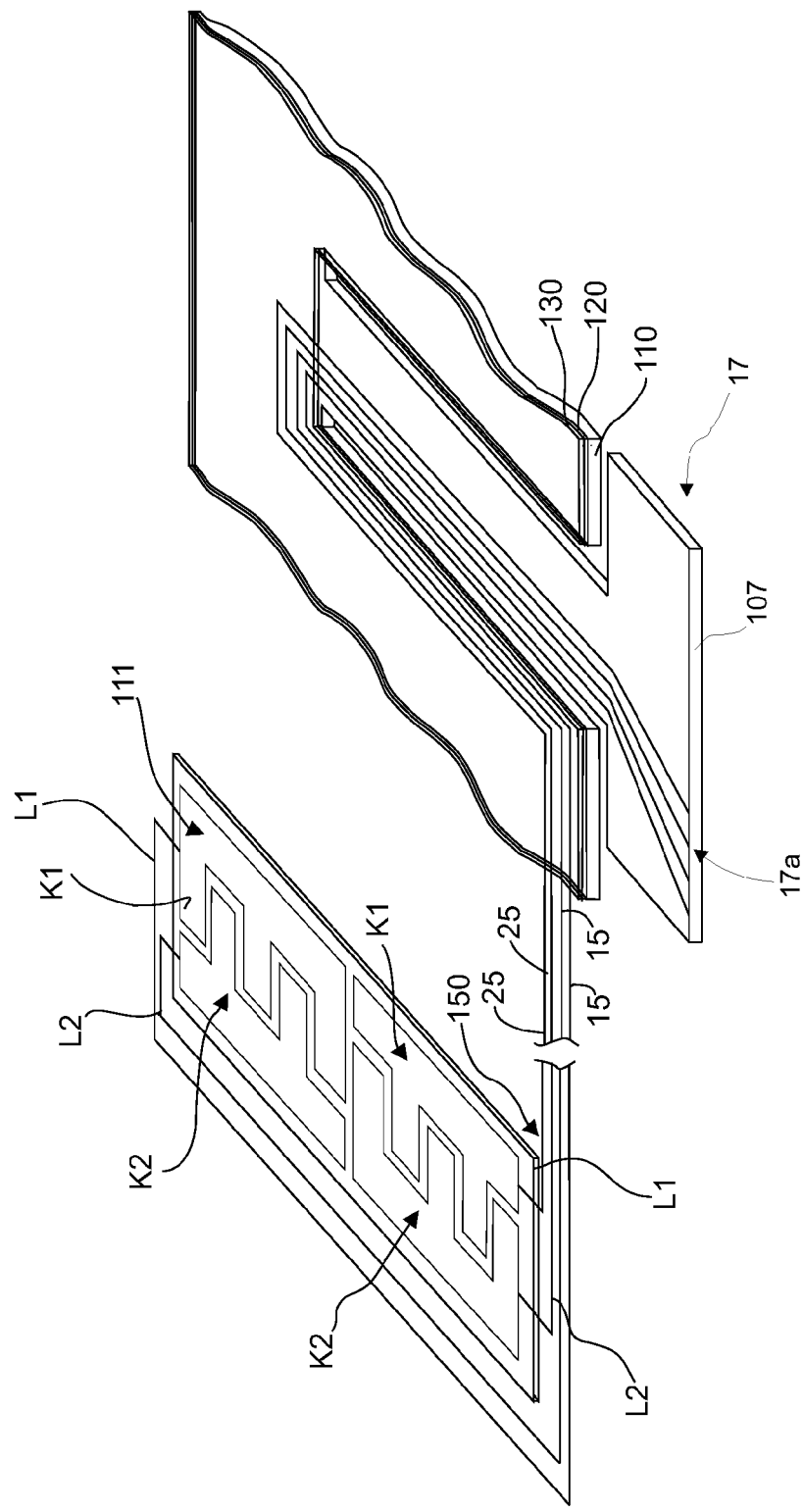
FIG. 3 is a perspective view of a first embodiment of the sensor plate, which is constructed from a base plate, a separator layer, a conductor layer and a connection device that is connected to the base plate, wherein the base plate of at least one detection sublayer comprises an arrangement of conductor paths.
Figure 4:
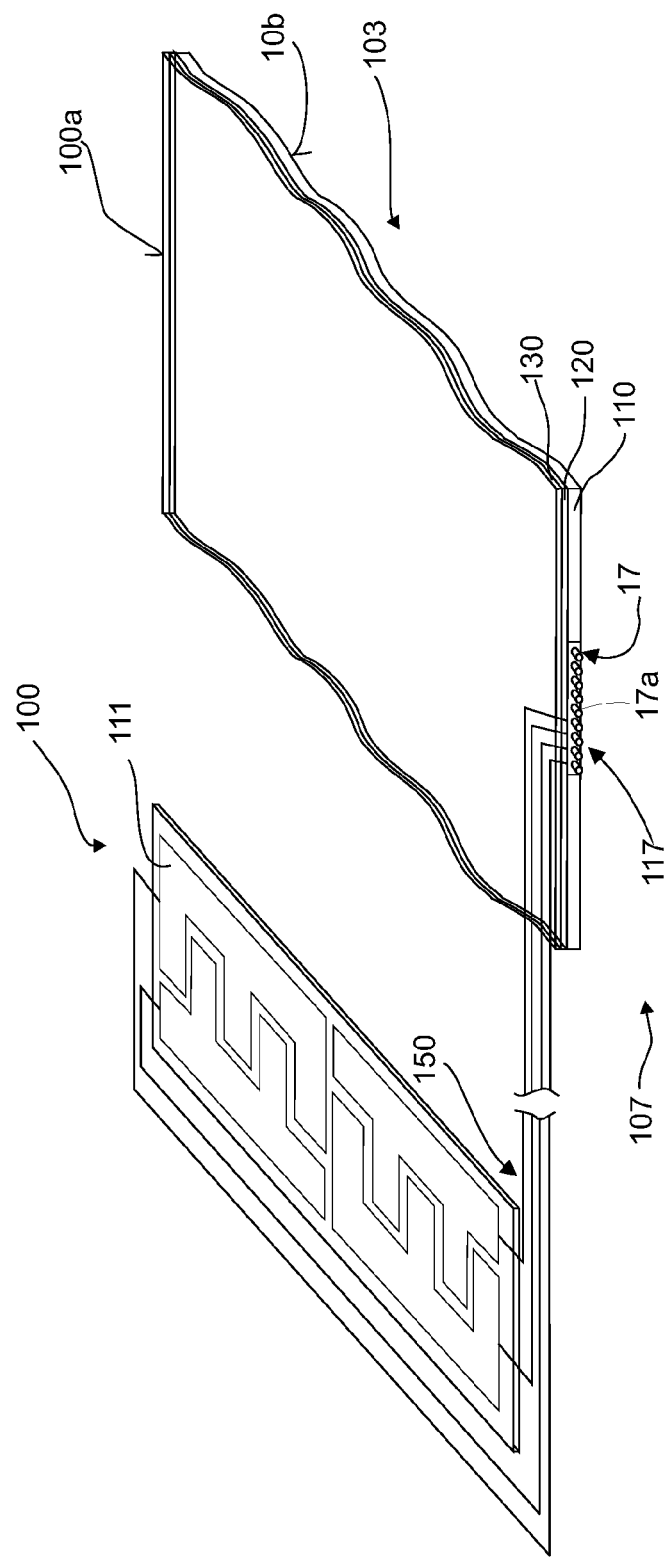
FIG. 4 is a perspective view of a second embodiment of the sensor plate, wherein the sensor plate illustrated comprises a different kind of connection device than the sensor plate of FIG. 2.

FIGS. 1, 5, 6 and 7 show different embodiments of the deposition device 1 according to the invention with a sensor device 10. The sensor device 10 consists of a base plate 20 and a sensor plate 100, and is constructed in the manner of an embodiment according to the invention. FIG. 2 shows a first embodiment of the sensor device 10 according to the invention, while FIGS. 3 and 4 show various embodiments according to the invention of the sensor plate 100.

The sensor plate 100 is generally of a plate-like construction and may be produced as a single layer or multiple layers joined to each other. A fixed coordinate system for the sensor plate 100, with a longitudinal direction SX, a transverse direction SY and a direction perpendicular to the major surface SZ is shown for exemplary purposes in FIG. 1. In particular the SX direction and the SY direction may each be defined as local directions, each being derived as a tangent to a lower surface $100b$ of the sensor plate 100. In this context, the SY direction may be defined such that each point thereof runs in the direction of a centre line M100 of the sensor plate 100, wherein the centre line M100 is derived as the connecting line of all centre points of a connecting line between the shortest distances from edge points along edge lines extending opposite each other on the sensor plate 100. In this respect, an edge line may be understood to be a line respectively connecting the two farthest points from one other on the sensor plate 100. The coordinate system may also be defined on the basis of the SZ direction, each point of which is defined as the direction of the shortest line connecting each point on one surface 100*a*, 100*b* to a corresponding point on the respective surface arranged oppositely thereto, the origin of said coordinate system being established as a point on the lower surface 100*b*. In this context, longitudinal direction SX may be fixed or it may be the centre line M100.

In each of these embodiments, the sensor plate 100 may be designed as a flexible plate, that is to say a mat, and as such particularly as an elastic plate. Alternatively, the sensor plate 100 may also be of a rigid construction in each of said embodiments. The sensor plate 100 comprises a first or upper surface 100*a* and a second or lower surface 100*b*. The sensor plate 100 also comprises at least one detection sublayer T. The at least one detection sublayer T may be integrated in sensor plate 100 as a film or foil. In such case, the detection sublayer T may be applied to a first surface 110*a* of a base plate of the sensor plate 100 as a film or foil and, for example, spread thereon or bonded thereto. In general, the sensor plate 100 may also have a multilayer construction, as is shown with layers 110, 120, 130 in FIG. 1.

Like the sensor plate 100, the base plate 20 generally has the form of a plate, and may be produced as a single layer or constructed from multiple layers joined to each other. A fixed coordinate system for the base plate 20, with a longitudinal direction GX, a transverse direction GY and a direction perpendicular to the major surface GZ is shown for exemplary purposes in FIG. 1. In particular the GX direction and the GY direction may each be defined as local directions, each being derived as a tangent to lower surface 20*b* of the base plate 20. In this context, the GY direction may be defined such that each point thereof runs in the direction of a centre line M20 of the base plate 20, wherein centre line M20 is derived as the connecting line of all centre points of a connecting line between the shortest distances from edge points along edge lines extending opposite each other on the base plate 20. In this respect, an edge line may be understood to be a line respectively connecting the two farthest points from one other on the base plate 20. The coordinate system may also be defined on the basis of the GZ direction, each point of which is defined as the direction of the shortest line connecting each point on one surface 20*a*, 20*b* to a corresponding point on the respective surface arranged oppositely thereto, the origin of said coordinate system being established as a point on the lower surface 20*b*. In this context, the longitudinal direction GX may be fixed or it may be the centre line M20.

In each of these embodiments, the base plate 20 may be designed as a flexible plate, that is to say a mat, and as such particularly as an elastic plate. Alternatively, the base plate 20 may also be of a rigid construction in each of said embodiments. The base plate 20 comprises a first or upper surface 20*a* and a second or lower surface 20*b*.

According to the invention, the sensor plate 100 generally comprises: at least one locating recess 101 to accommodate a locating lug 102 when the sensor plate 100 and the base plate 20 are assembled to create a sensor device 10. FIG. 2 shows the assembled or operationally ready state of the sensor device 10 according to FIG. 1. Each locating recess 101 and the respectively associated locating lug 102 are designed in such manner that the locating recess 101 allows the respectively associated locating lug 102 a predefined minimum freedom of movement. In a plan view of the surface 100*a*, a shape of the outer contours of the locating recess 101 and of the respectively associated locating lug 102 in the direction perpendicular to the major surfaces GZ and SZ is such that the locating lug 102 allows the respectively associated locating recess 101*a* local freedom of movement of the sensor plate 100 in all directions of the planar extension thereof, that is to say in longitudinal direction SX and transverse direction SY within the maximum range of movement allowable and as defined by the shape of the locating recess 101.

According to one embodiment of the sensor plate 100, it is configured in such manner that the at least one locating recess 101 does not completely pass through a detection sublayer T of the sensor plate 100, and is consequently suitable for an area 103 in which the at least one detection sublayer T does not extend.

Figure 1:
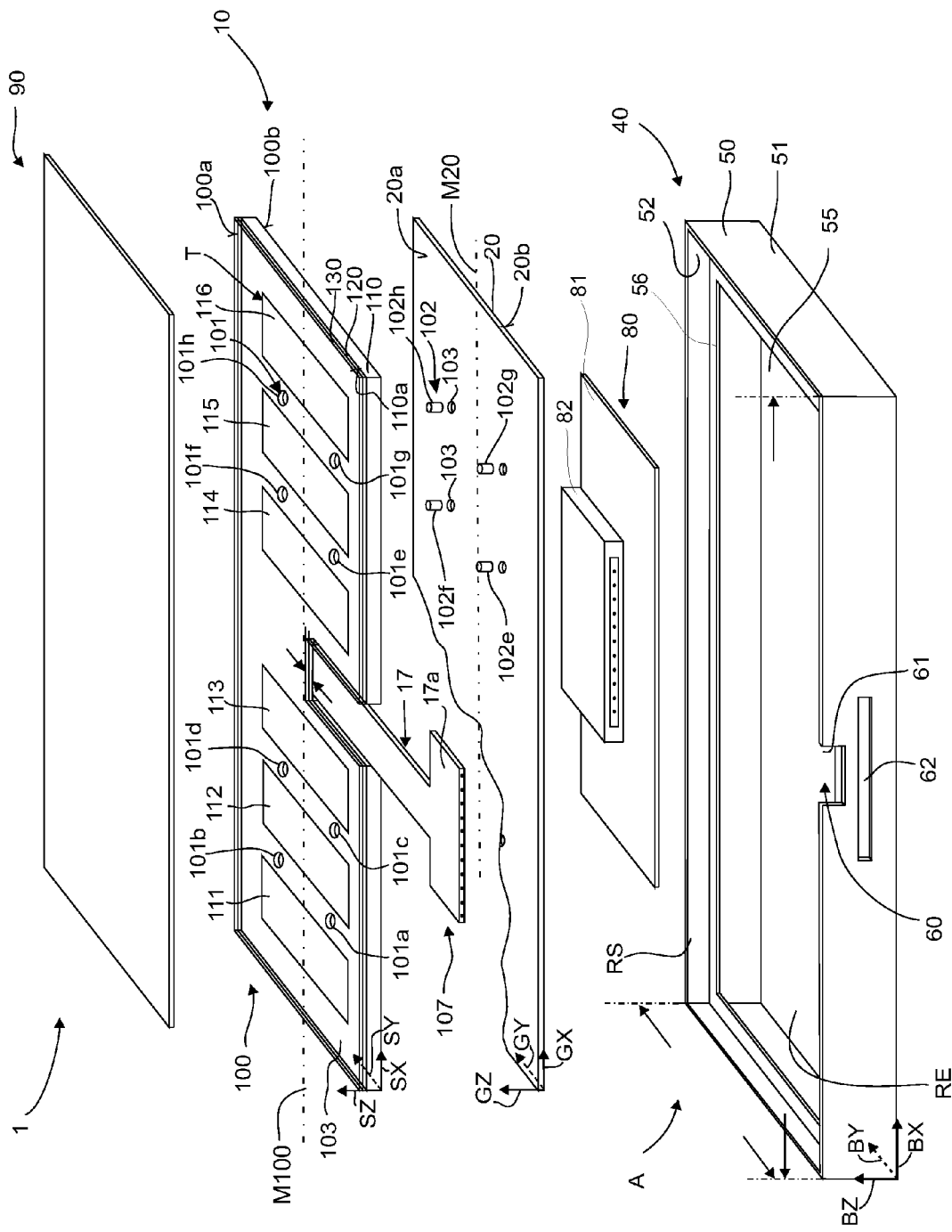
FIG. 1 is an exploded perspective view of a first embodiment of the deposition device according to the invention, wherein the represented embodiment of the deposition device comprises a containing device and a sensor device, which is constructed from a base plate having a plurality of locating lugs and a sensor plate having a plurality of locating recesses, each of which is designed to accommodate one of the locating lugs.
Figure 2:
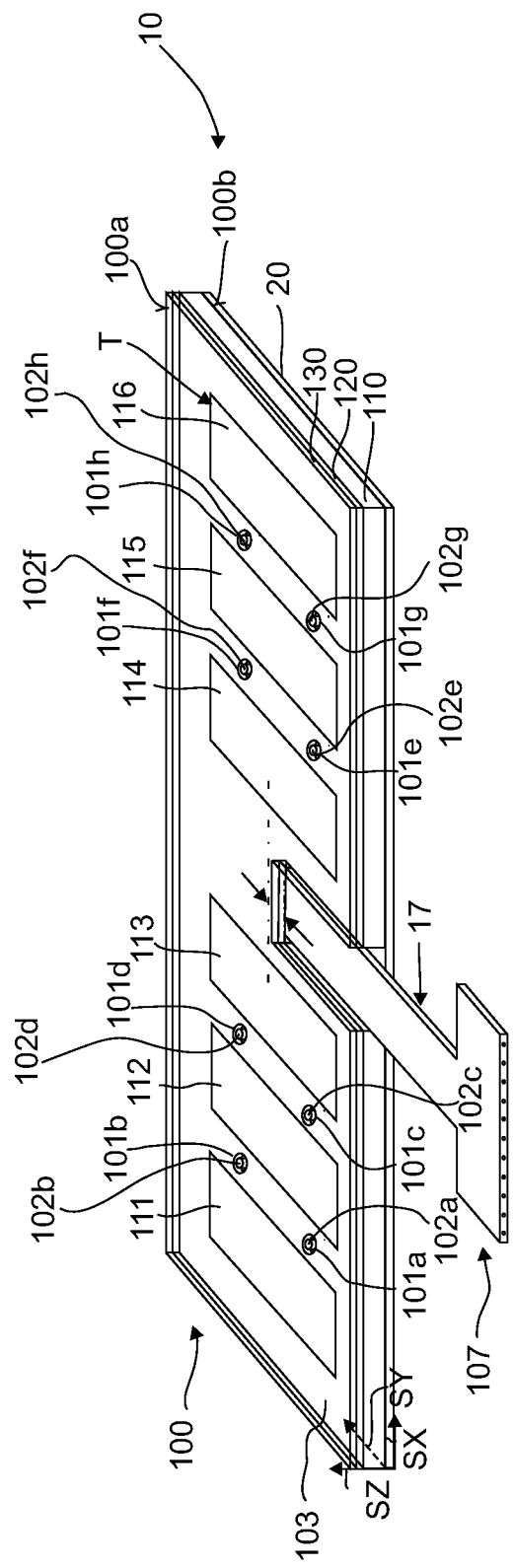
FIG. 2 is an embodiment of the sensor device according to the invention, which is integrated in the deposition device of FIG. 1.
Figure 6:
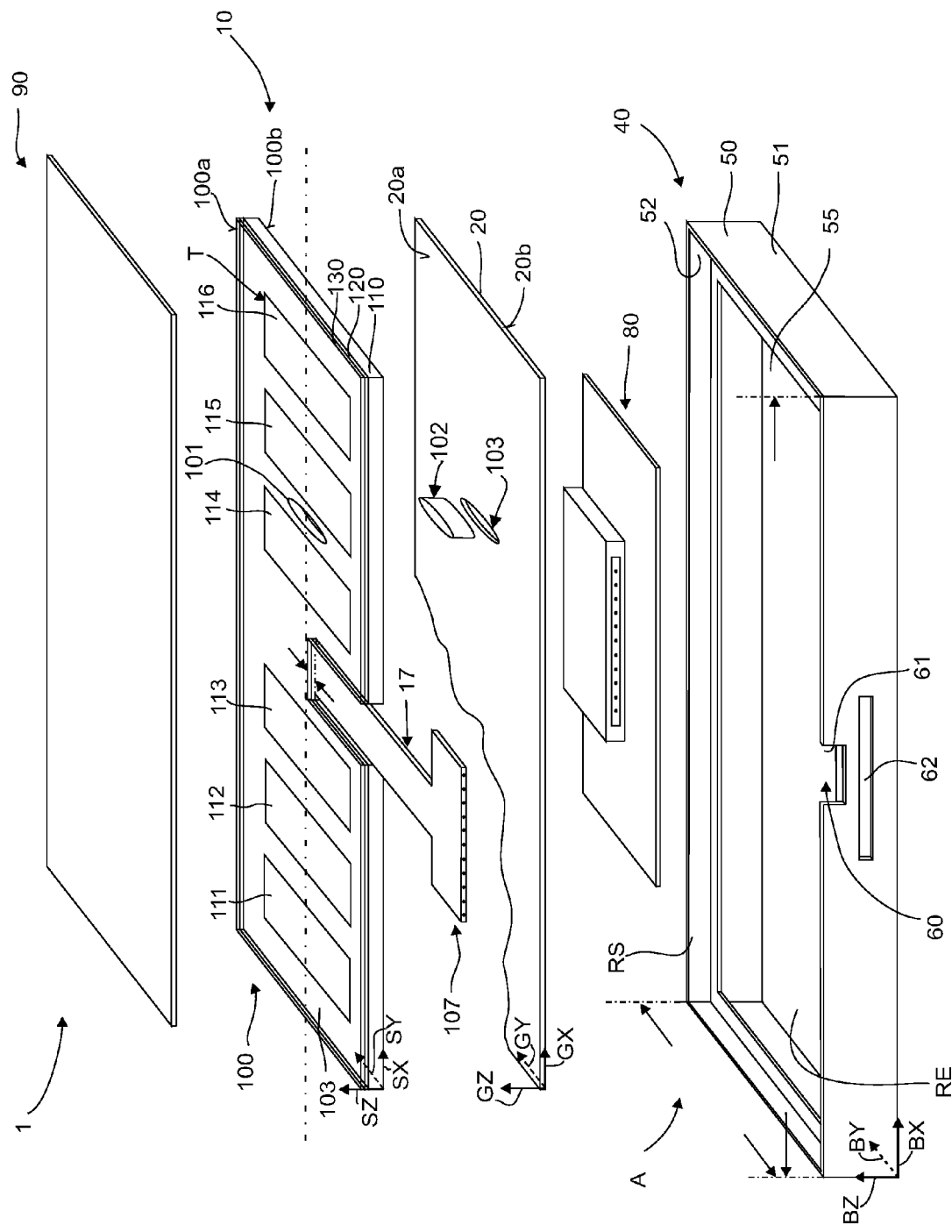
FIG. 6 is an exploded perspective view of a further embodiment of the deposition device according to the invention, wherein the deposition device illustrated comprises a different kind of sensor device than the deposition device of FIG. 1, in that it is constructed from a base plate having a single locating lug and a sensor plate having a single locating recess for accommodating the locating lug.

In the embodiment of sensor device 10 according to FIGS. 1 and 2, the base plate 20 is furnished with a total of six locating lugs 102*a*, 102*b*, 102*c*, 102*d*, 102*e*, 102*f*, 102*g*, and 102*h*, the lengthwise direction of which projects away from the base plate 20 in the direction perpendicular to the major surface GZ. Generally, the at least one locating lug 102 may be configured as a pin, that is to say a locating pin, as shown in FIGS. 1 and 2, and in particular may be cylindrical, with a circular cross section, when the cross section is obtained by viewing in the plane GX-GZ. Each locating lug 102 may also have an oval cross section, as is shown in FIG. 6. Alternatively, polygonal, for example rectangular, cross sections are possible for the locating lug 102. In particular, it may be provided that the locating lug 102 has a cross section and size when viewed in the GX-GZ plane that is unchanged along the direction perpendicular to the major surface GZ.

The locating lug 102 may also be produced integrally with base plate 20 (FIG. 14). Alternatively, the locating lug 102 may be produced as a separate component from the base plate 20 (for example, FIGS. 1, 5, 6, and 7). In this case, a depression 103 or recess may be conformed in the base plate 20, in which the respective leg may be inserted. Alternatively, the at least one locating lug 102 may also be placed on a surface 20*a* of the base plate 20 and fixed by bonding or welding, for example, as is also shown in FIG. 14.

In the embodiment of the sensor plate 100 according to FIGS. 1 and 2, the sensor plate 100 is furnished with a total of six locating recesses 101*a*, 101*b*, 101*c*, 101*d*, 101*e*, 101*f*, 101*g*, and 101*h* to accommodate each of the six locating lugs 102*a*, 102*b*, 102*c*, 102*d*, 102*e*, 102*f*, 102*g*, and 102*h*. Generally, the sensor plate 100 is furnished with at least one locating recess 101. As described previously, the number, as well as, the shape and size of the locating recesses 101 and the respectively associated locating lugs 102 are constructed such that locating lug 102 has a freedom of movement in the respective locating recess 101, which however is limited in the SX and SY directions and in the direction of rotation about the SZ axis. The free play may be provided such that in the SX and SY directions it amounts to from about 1% to about 10% or from about 1% to about 100% of the average thickness of sensor plate 100 in the SZ direction. The free play may also be greater or smaller than the range indicated.

By this means, it is ensured that even significant temperature differences, e.g. in the range between 50K and 200K or even 300K or more, and the consequent changes in length of the sensor plate 100 will not cause local deformation thereof, and the sensor plate 100 will remain within specified limits and under no stress on the base plate 20. The sensor function provided or supported by the sensor plate 100 is also not impaired thereby.

The sensor plate 100 comprises at least one detection sublayer T and one connection device 17 for connecting the sensor plate 100 electrically to an evaluation device 80, and an arrangement 150 of conductor tracks 15, which connects the connection device 17 electrically to the detection sublayer T. In the embodiments shown in FIGS. 1, 4, 5 and 6, a total of six detection sublayers 111, 112, 113, 114, 115, 116 are integrated in the sensor plate 100.

According to the invention, the evaluation function of the evaluation device 80 may be provided in such manner that it has the range of movement of the sensor plate 100 on the base plate 20 stored in memory as predefined sensor plate position values or a range of sensor plate position values, so that the evaluation device 80 allocates a position of a detectable physical condition to a sensor signal that is generated by the detection sublayer T in response to said detectable physical condition within accuracy limits that are determined by the range of movement. Optionally, in this context, a temperature of the sensor plate 100 or the base plate 20, captured by a temperature sensor for each (not shown) may also be taken into account.

The evaluation device 80 may particularly consist of a base plate 81 and a housing 82 arranged thereon, in which a function module (not shown) with an evaluation function and a connector socket 83 for connecting a plugging device 17a of the connection device 17 is integrated. In general, the evaluation device 80 may also be configured as a conductor board, that is to say without a housing.

To construct the deposition device 1 according to the invention, a sensor device 10 according to the invention is inserted or integrated in a containing device A. A die containing device A may be designed as a frame constructed with a rod assembly (not shown). Alternatively, the containing device A may also be constructed as a housing-like containing device 40 and in the form of a trough, for example, as is shown for example on the embodiment of the deposition device 1 according to FIG. 1. For the containing device 40 shown in FIG. 1, a coordinate system with a longitudinal direction BX, a transverse direction BY and a direction perpendicular to the major surface BZ is indicated.

The containing device 40 illustrated in FIG. 1 comprises a bottom plate 55 and a peripheral side wall 50 that surrounds the bottom plate 55 at a distance therefrom in the direction perpendicular to the major surface BZ. The bottom plate 55 and the peripheral side wall 50 thus enclose a containing space RS. The evaluation device 80 may be inserted in the containing space RS, wherein the evaluation device 80 may be positioned on the bottom plate 55.

A support plate 56 may be arranged around the entirety or sections of an inner surface of the side wall 50 facing toward the containing space RS, and on which the base plate 20 may be placed. In this way, a wall section 51 is created that extends between the bottom plate 55 and the support plate 56. The base plate 20 and the side wall 50 as well as the support plate 56 may be designed such that the base plate 20 is held in a fixed position inside the containing device 40. In particular, it may be provided that the base plate 20 may be pressed flat in the containing device 40. In the embodiment of the containing device 40 shown in FIG. 1, the support plate 56 is positioned in such manner in the direction perpendicular to the major surface BZ that when viewed in said direction BZ a wall section 52 protrudes above the support plate 56.

In general, the deposition devicel may comprise a covering plate 90 or covering film 90 which—if such is intended in an embodiment—is laid on top of the sensor plate 100 for protection thereof or to create desired aesthetic, visual and/or tactile effects.

The sensor plate 100 fulfils a planar sensor function, since the sensor plate 100 comprises at least one detection sublayer T. The respective sensor is realised because the sensor device 10 comprises a connection device 17 and conductor tracks 18, connecting each of the at least one detection sublayers T electrically to the connection device 17. In particular, each of the at least one detection sublayers T is designed such that a voltage is applied to the sensor plate 100. In this case, two external voltage terminals of an external power supply device located outside the sensor device 10 may be connected to connection device 17 and thus to the detection sublayer T via the conductor tracks 18 in accordance with the respective embodiment thereof.

The planar sensor function, which is performed by the respective detection sublayer T, may contain or provide one or more of the following sensor functions, or also other sensor functions: a pressure sensor function, a proximity sensor function, and an electromagnetic radiation sensing function. In particular, the sensor plate 100 is designed in such manner that it performs a planar sensor function, in which a physical set of conditions is captured on or at the first surface 100a—that is to say also "in a plane"—because a voltage change takes place through the sensor plate, which voltage change can be captured by the connection device 17. An evaluation device 80 may also be connected to the connection device 17 via each of the at least one detection sublayers T, which is/are connected to the connection device 17 via two electrical wires. Said evaluation device 80 is designed to evaluate the sensor signals generated by the detection sublayer T in response to a physical condition that the layer is able to detect, in such manner that the device is able to assess the value of the detected physical situation, e.g., by determining whether a specified limit value therefor has been exceeded.

For example, in order to perform the pressure sensor function, the detection sublayer T has the form of a pressure-sensitive film, by which a change in the voltage at the connection device 17 may be detected as a physical event when an object is placed on the first surface 100a, and is transmitted to the evaluation device 80. Then, the evaluation device 80 executes an evaluation function to determine that an object has been placed on the first surface 100a. The detection sublayer T may be made from a piezoelectric material which responds to a local compression by causing a voltage change that can be interpreted by the evaluation device 80.

Alternatively, as is described in greater detail here with reference to FIG. 3, the detection sublayer T may be constructed from interlocking foil elements K1, K2 to enable pressure sensitivity over an area. An electric wire L1 and L2 is connected to each of foil elements K1, K2. As shown in FIG. 3, foil elements K1, K2 may also be configured in such manner that they overlap one another alternatingly in a serpentine manner to create areally optimised coverage for achieving planar pressure sensitivity. As is shown in FIG. 3, foil elements K1, K2 may be crenellated, with foil teeth, which overlap and are interposed upon each other in the planar extension. Foil elements K1, K2 are positioned with a relatively small distance therebetween, which distance is provided to ensure that no electrical current flows between the elements when an electric voltage is applied to wires L1, L2.

In the embodiments shown in FIGS. 1, 4, 5 and 6, a total of six detection sublayers 111, 112, 113, 114, 115, 116 are integrated in the sensor plate 100, which sublayers may be placed or integrated in a base plate 110. At least a pair of foil elements K1, K2 is integrated in each of the detection sublayers 111, 112, 113, 114, 115, 116, thus creating an arrangement 150 of conductor tracks L1, L2, or 15. The base plate 110 is particularly constructed as a circuit board.

In the embodiments of foil crenellations K1, K2 shown in FIGS. 3 and 4, a first foil crenellation K1 is connected to a first electrical wire L1, and may then be connected via said wire L1 and by means of the connection device 17 to a first external voltage terminal of the external power supply device. In addition, a second crenellation K2 of the foil crenellations K1, K2 is connected to a second electrical wire L2, and through this wire L2 it may be connected to a second external voltage terminal of the external power supply device by means of the connection device 17. Electrical wires L1, L2 are electrically connected to the evaluation device 80, which includes or is connected to the power supply device.

In this embodiment, the sensor plate 100 consists of a base plate 110, in which the at least one detection sublayer T is integrated, a separator device 120 and a conductor layer 130. The conductor layer 130 is a layer or foil made from an electrically conductive material. The separator device 120 may be in the form of one layer or a plurality of separators. If the separator device 120 is in the form of a single layer, the separator device 120 may particularly be constructed as a flexible mesh, that is to say a mesh of a flexible and particularly an elastic material. The separator device 120 is generally designed in such manner that when an object of a predefined minimum size and a predefined minimum weight is placed on the surface 100a, the foil elements K1, K2 are connected to one another in an electrically conductive manner through the conductive layer 130. In this way, when an object is laid on the sensor plate 100, the evaluation device 80 is able to detect a voltage change and therewith also the physical set of conditions of this act of placing an object on the sensor plate 100.

In the embodiment of the sensor plate 100 according to FIG. 3, the connection device 17 is designed as a ribbon cable 107 with a plug device 17a attached to one end thereof.

In contrast thereto, in the embodiment of the sensor plate 100 according to FIG. 4, the connection device 117 is designed with a plug device 17a that is physically integral with the base plate 110. The plug device 17a is thus an integral part of the base plate 110 and may be affixed thereto for example by bonding or welding, or it may be manufactured as a single part therewith.

Figure 5:
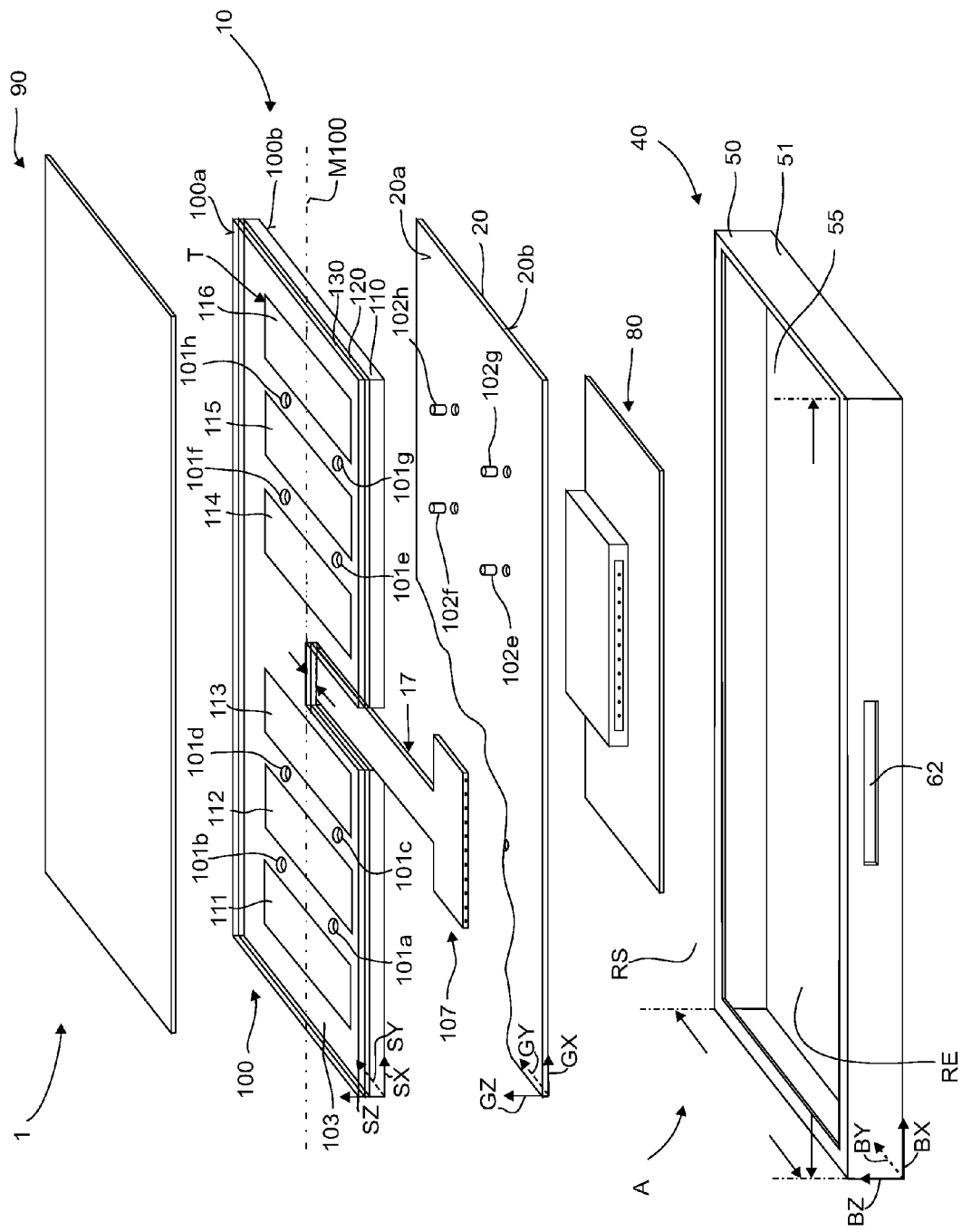
FIG. 5 is an exploded perspective view of a further embodiment of the deposition device according to the invention, wherein the deposition device illustrated comprises a different kind of containing device than the deposition device of FIG. 1.

FIG. 5 shows a further embodiment of a deposition device 40 according to the invention which does not include a protruding wall 52, so that sensor device 10 is located on the deposition device 40 and protrudes therefrom in the BX direction.

FIG. 6 shows a deposition device 1 and a sensor device 10 having only a single locating lug 102 and a single sensor plate with a single locating recess 103 for accommodating the locating lug 102, wherein the locating lug 102 and the sensor plate with a single locating recess 103 have a cross sectional shape, in this case an oval cross sectional shape, which limits the freedom of movement of the sensor plate 100 on the base plate 20 in the GX and GY direction only.

Figure 7:
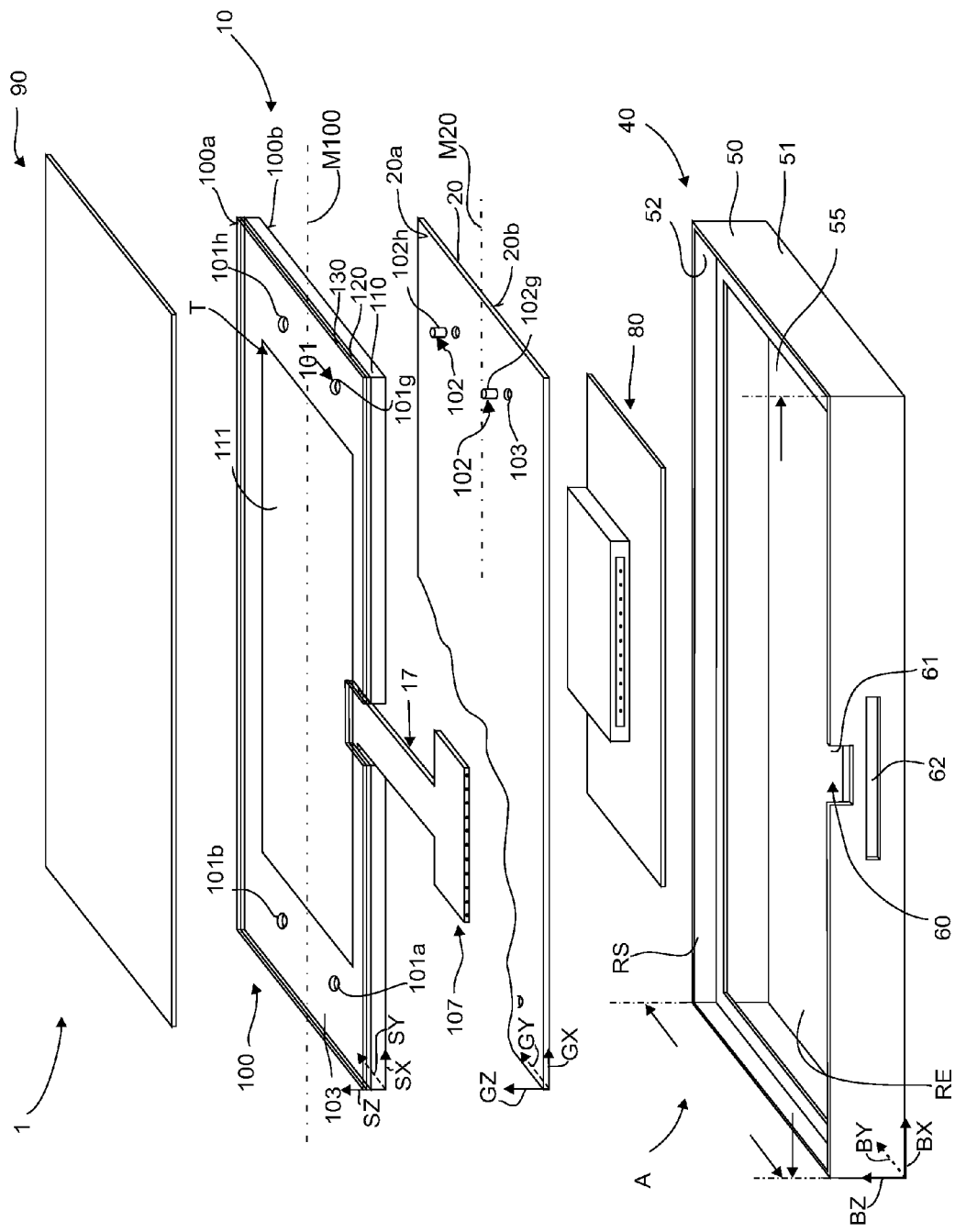
FIG. 7 is an exploded perspective view of a further embodiment of the deposition device according to the invention, wherein the deposition device illustrated comprises a different kind of sensor device than the deposition device of FIG. 1.

FIG. 7 is a perspective illustration of a further embodiment of a deposition device 40 according to the invention, comprising a different kind of sensor device than the deposition device illustrated in FIG. 1, wherein the sensor device has only one detection sublayer T or 111, so that the sensor plate is provided with locating recesses 103 that are located outside of the detection sublayer T or 111 to accommodate locating lugs 102.

Figure 8:
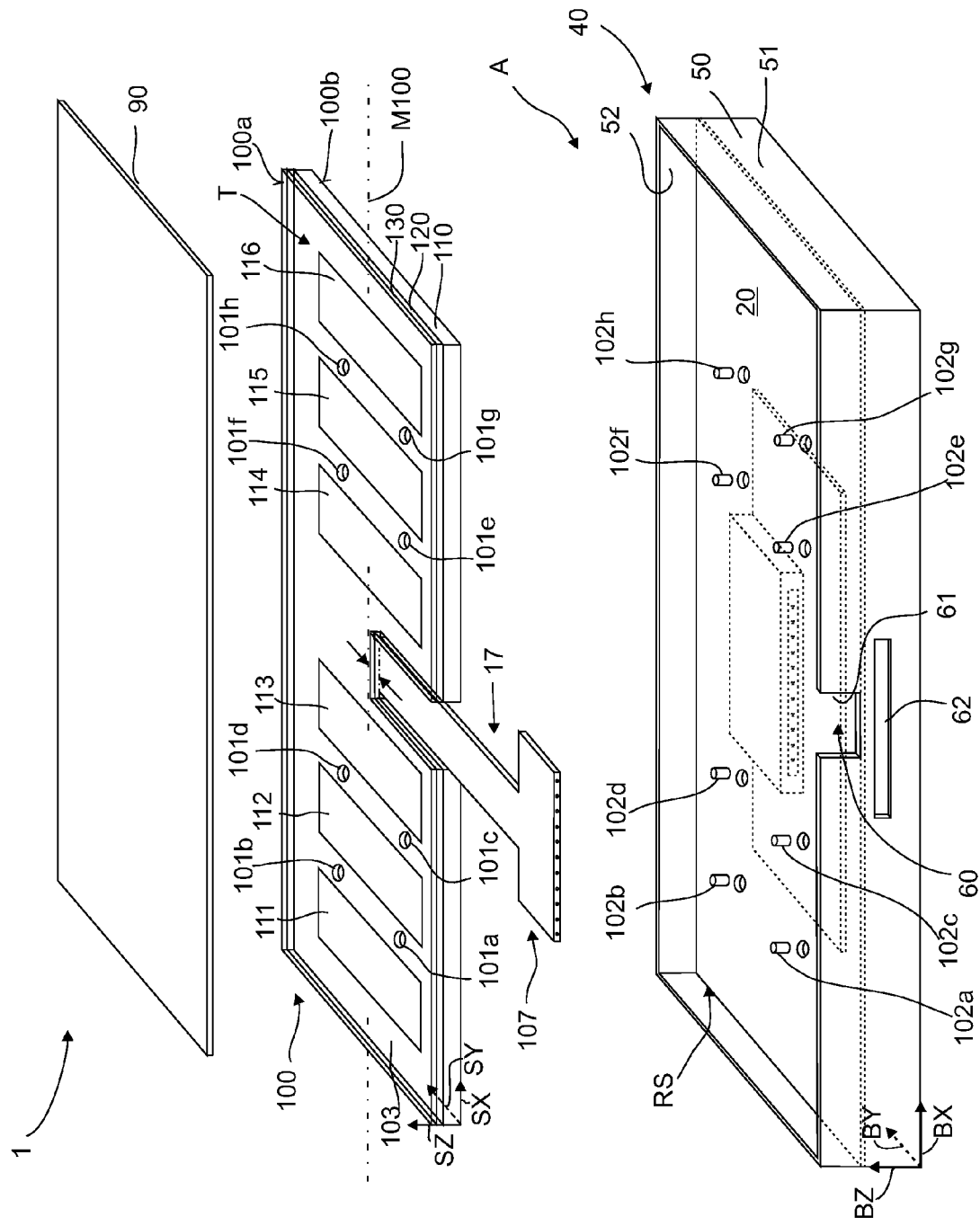
FIG. 8 is an exploded perspective view of a further embodiment of the deposition device according to the invention, wherein the deposition device illustrated comprises a different kind of containing device than the deposition device of FIG. 1.

FIG. 8 shows a further embodiment of a deposition device 40 according to the invention, which differs from the deposition device of FIG. 1 in that it has a continuous support plate 56, thereby covering a containing space RS completely. For this purpose, a passthrough opening 60 has a first opening 61 in an area of a wall section 52 and a second opening 62 in the area of the wall section 52, so that a connection device 17 in the form of a cable 107 can be routed through the openings 61, 62 to the evaluation device 80 in the containing space RS.

FIG. 10 shows an embodiment of a sensor plate 100 of a sensor device 10 that is furnished with slots S extending between detection sublayers T. According to one embodiment of the sensor plate 100, in this context it is provided that said slots extend from one lateral edge in the SX direction to beyond a centre line M100, and in particular over more than 75% of the width of the sensor plate 100 in a transverse direction SY.

Figure 11:
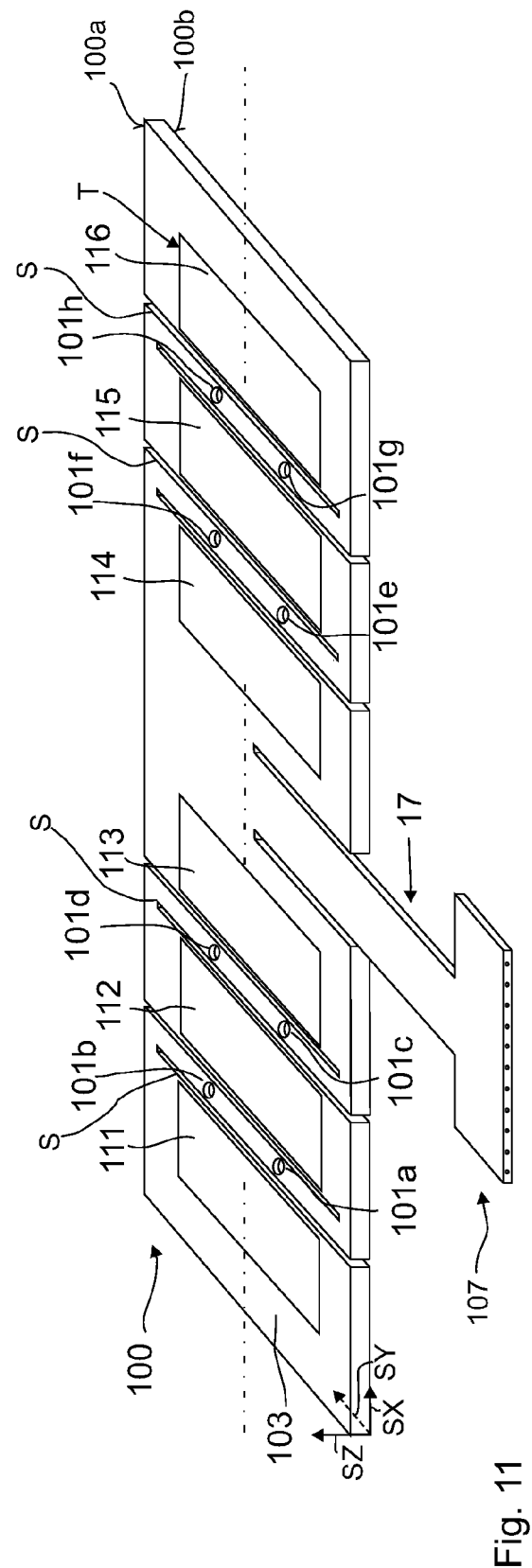
FIG. 11 is a perspective view of a variant of the sensor plate of FIG. 10.
Figure 18:
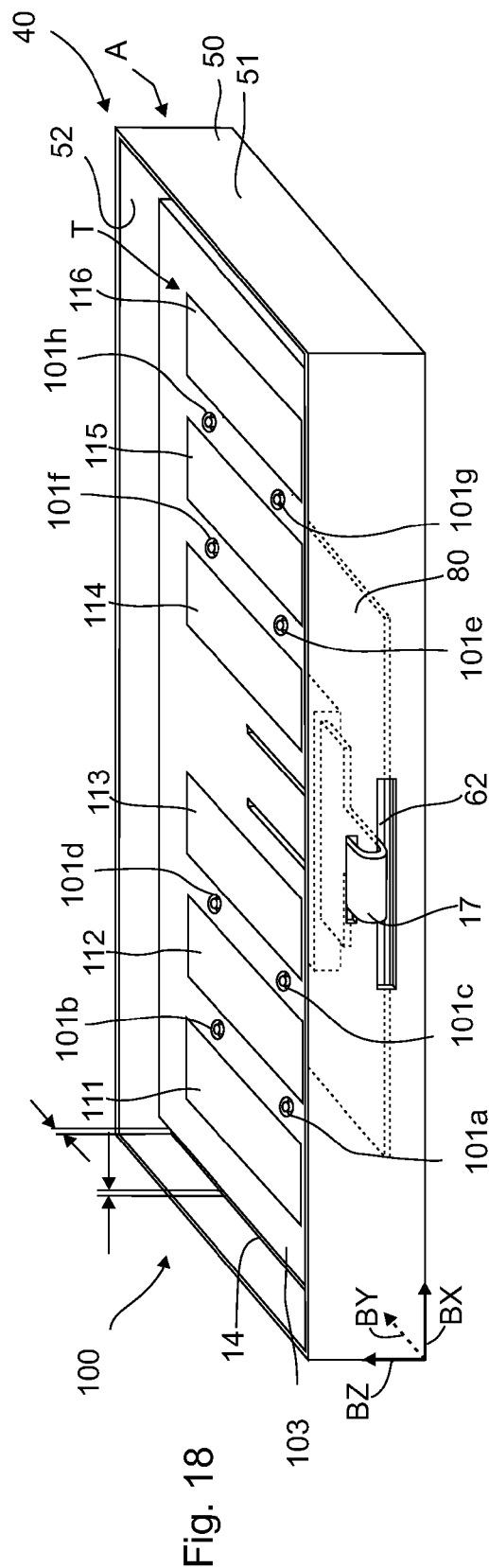
FIG. 18 is a perspective view showing the deposition device of FIG. 16 without a cover film.
Figure 19:
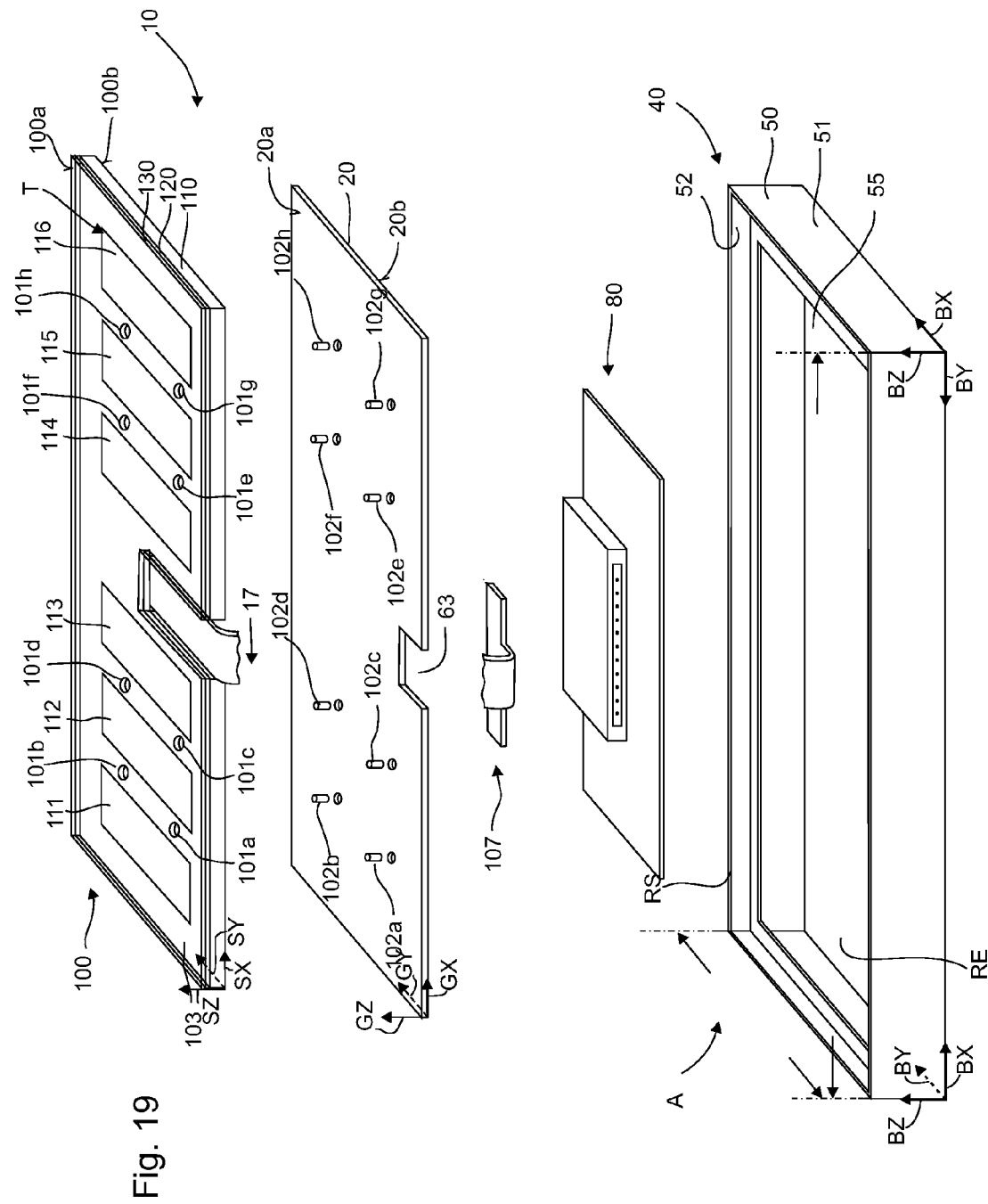
FIG. 19 is a disassembled view of the deposition device of FIG. 17.
Figure 20:
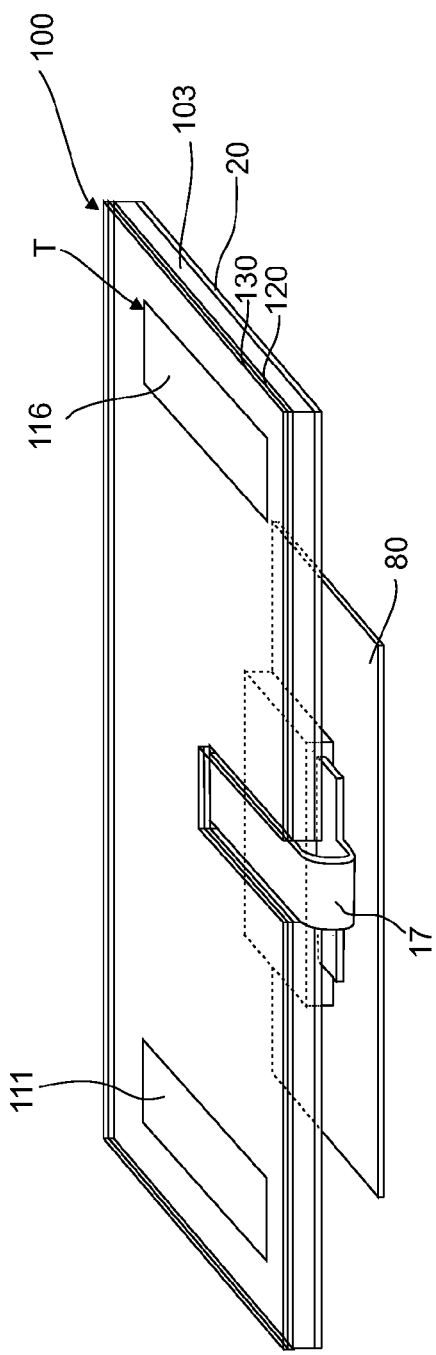
FIG. 20 is a perspective view showing a combination of a sensor device according to FIG. 2 and an evaluation device that is attached to a lower surface of the base plate.
Figure 21:
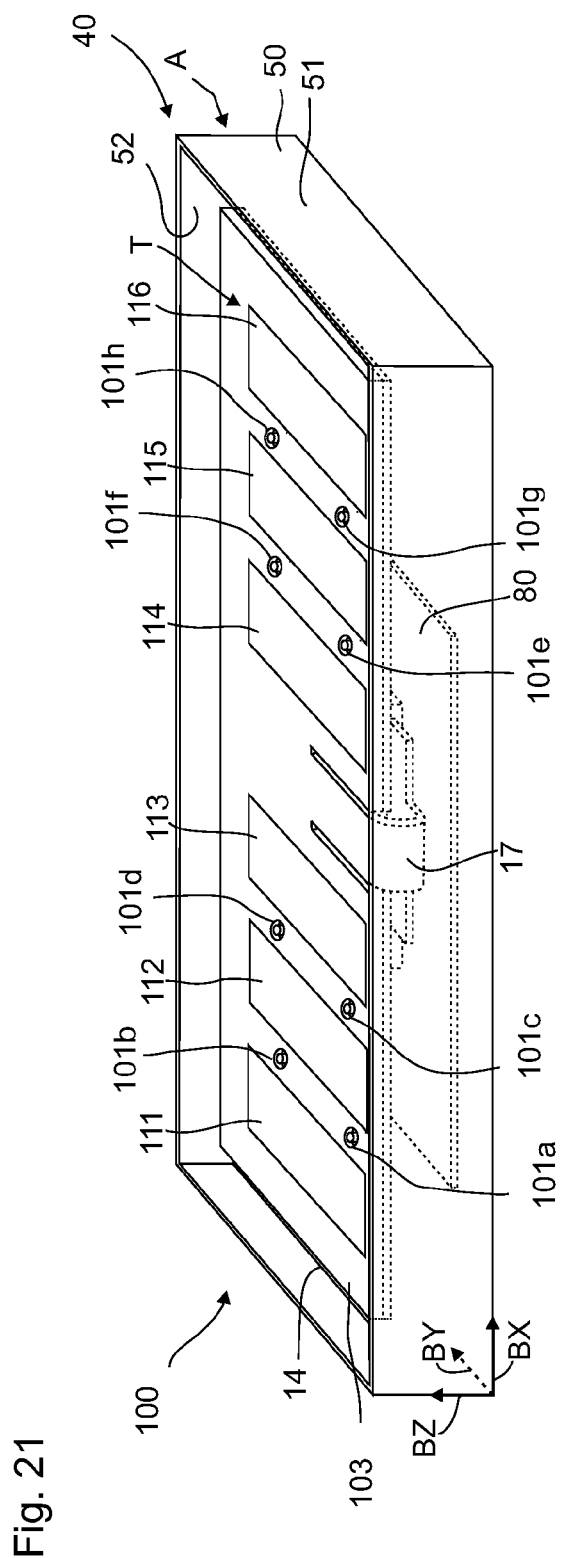
FIG. 21 is a perspective view showing an embodiment of a deposition device with the combination of a sensor device and an evaluation device of FIG. 20.
Figure 22:
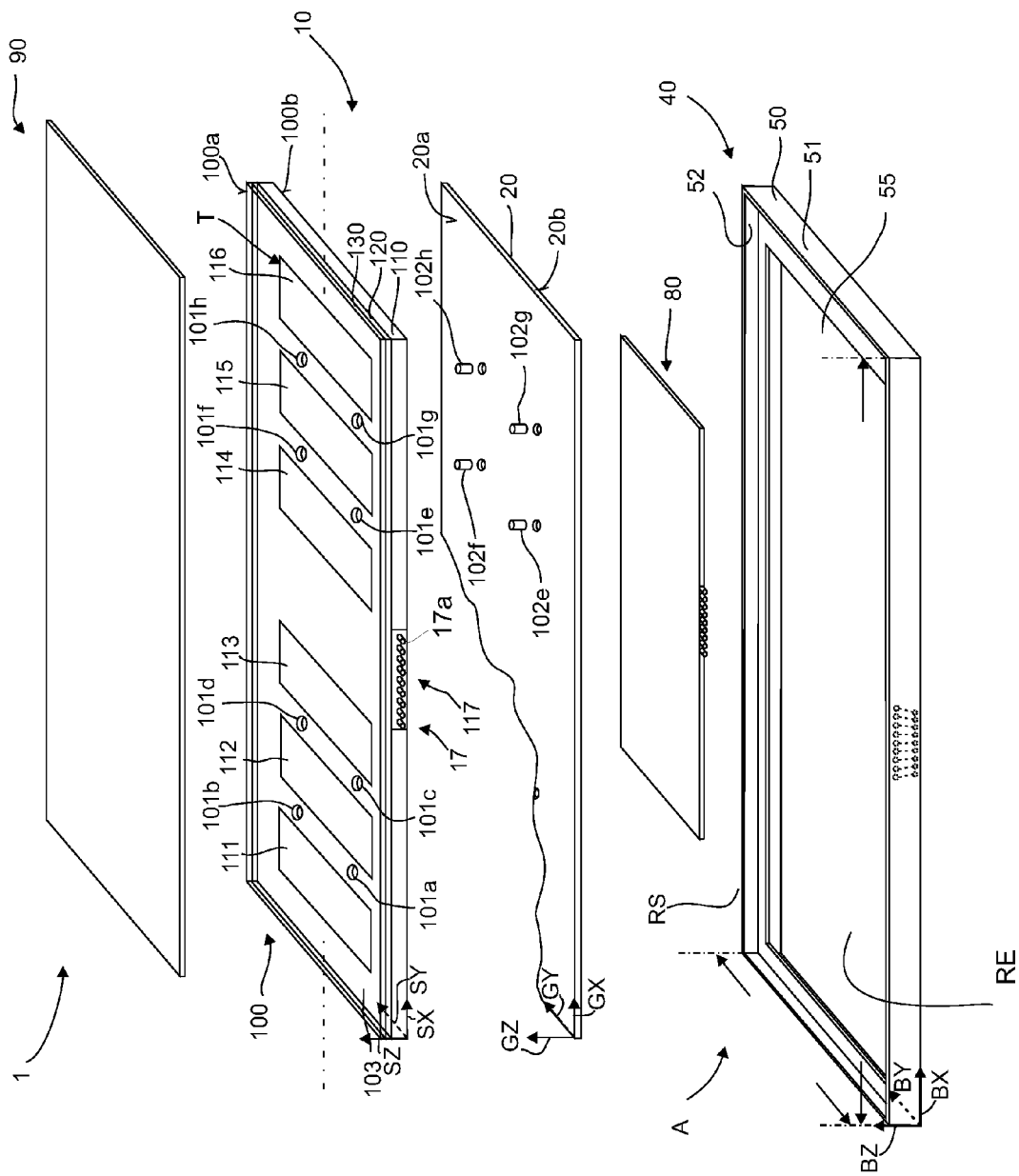
FIG. 22 is a perspective exploded view showing a variant of the embodiment of the deposition device of FIG. 1, wherein the sensor plate comprises a plug device according to FIG. 4.
Figure 23:
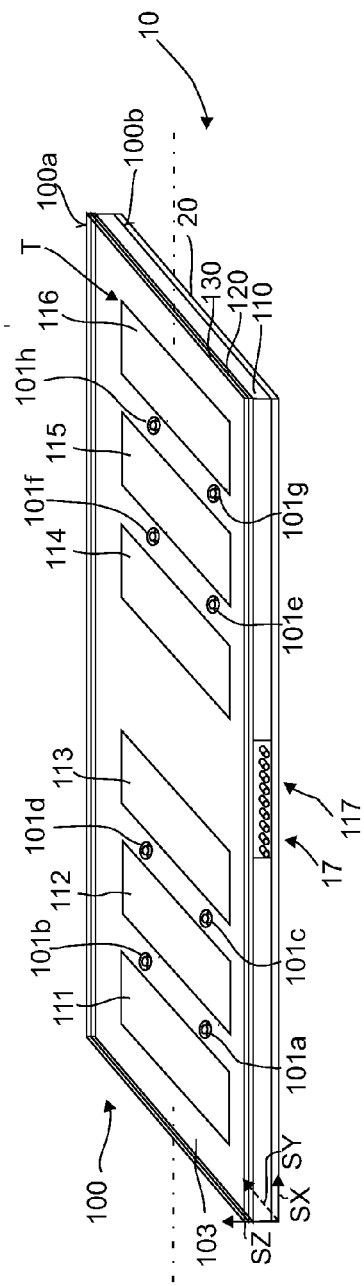
FIG. 23 is a perspective view showing a sensor device in the assembled state, wherein the sensor plate comprises a plug device according to FIG. 4.

As shown in FIG. 11, it may further be provided that two slots S beginning from opposite positions on lateral edges of a sensor plate 100 extend between each of two detection sublayers T. In this case, the locating recesses 101 may be positioned between the two slots S.

As shown in FIG. 12, a sensor plate 100 may comprise a support plate 105, on which a base plate 110 is placed. The support plate 105 may be designed as a dimensionally stable or rigid plate.

As shown in FIG. 9 and the following figures, particularly FIGS. 13a, 13b and 14, locating lugs 102 do not have to pass all the way through locating recesses 101 in the SZ direction. Instead, it may also be provided that they only partly penetrate locating recesses 101. Locating recesses 101 may also be depressions in a surface 100b.

Figure 24:
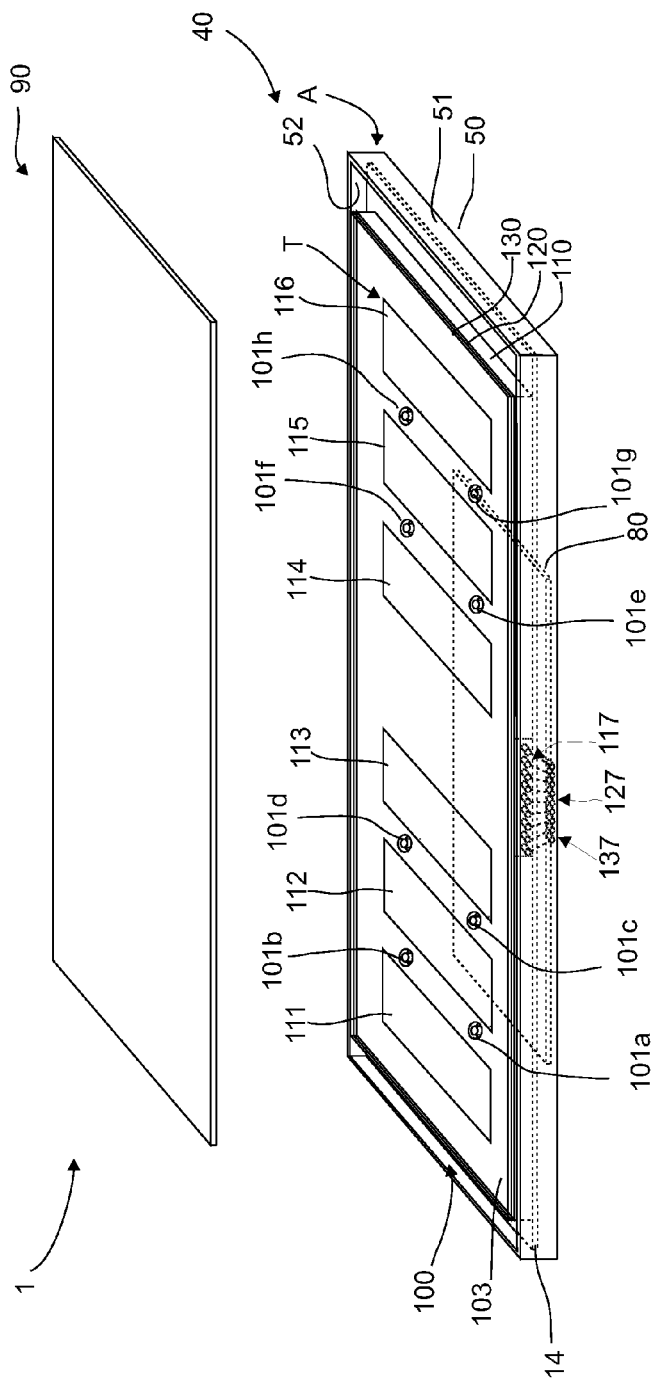
FIG. 24 is a perspective view showing a further embodiment of the deposition device.

FIG. 24 shows a further embodiment of a deposition device 40 in which the plug device of FIG. 4 is plugged into a plug socket 137 that is integrated in a housing wall 50, and in which a plug device 127 of an evaluation device 80 is also plugged into the plug socket 137.

What is claimed is:

1. A sensor device, comprising:
    a base plate including:
    at least one locating lug, a lengthwise direction of the at least one locating lug projecting away from the base plate in a direction perpendicular to a major surface of the sensor device and the at least one locating lug being arranged on the base plate; and
    a sensor plate positioned on the base plate, the sensor plate including:
    at least one locating recess for positioning the sensor plate within a maximum range of movement, the maximum range of movement defined by the shape of the locating recess;
    at least one detection sublayer; and
    a connection device for connecting the sensor plate electrically to an evaluation device,
    wherein each of the at least one locating lugs protrudes into a respective one of the at least one locating recess and a cross section of the at least one locating lug is such that over an entire length thereof the respective locating recess permits a local movement of the sensor plate, in all directions in a planar extension thereof, within the maximum range of movement on the base plate; and a cross section of the at least one locating lug is also such that over the entire length thereof the respective locating recess permits a free movement of the at least one locating lug in the direction perpendicular to the major surface of the sensor device and away from the sensor plate.

2. The sensor device according to claim 1, wherein the cross section of the at least one locating lug is also such that over the entire length thereof the respective locating recess permits a free movement of the at least one locating lug in the direction perpendicular to the major surface of the sensor device and away from the sensor plate.

3. The sensor device according to claim 1, wherein the at least one locating lug includes a uniform cross-section over the entire length of the at least one locating lug such that the respective locating recess permits the local movement of the sensor plate within a uniform separation distance between the locating recess and the respective locating lug in all directions in the planar extension thereof.

4. The sensor device according to claim 1, wherein the sensor plate further includes a base plate, a separator layer disposed thereon, and a conductor layer disposed on the separator layer.

5. A deposition device, comprising:
a containing device including:
a bottom plate;
a base plate located above the bottom plate in a direction perpendicular to a major surface of the containing device, the base plate having at least one locating lug, which projects lengthwise away from the base plate in a direction perpendicular to a major surface of the containing device;
a peripheral side wall that laterally delimits an electronics container space located between the bottom plate and the base plate and extends from the base plate to create a lateral delimitation of a sensor container space located above the base plate; and
a sensor plate located on the base plate, the sensor plate including:
at least two locating recesses for positioning the sensor plate within a maximum range of movement within the at least two locating recesses; and
at least one detection sublayer, and
wherein:
at least one of the base plate and the peripheral side wall has at least one passthrough opening through which an electrical connection device connected to the sensor plate is routed to enable a connection between the sensor plate and an evaluation device arranged in the electronics container space;
the at least one locating lug is arranged on the base plate such that each of the at least one locating lugs protrudes into a respective one of the at least two locating recesses and a cross section of the at least one locating lug is such that over an entire length thereof the at least two locating recesses permits a local movement of the sensor plate in all directions in a planar extension thereof, within the maximum range of movement within the at least two locating recesses;
the planar extension of the sensor plate is configured in such manner that in order to prevent a lateral edge thereof from contacting the peripheral side wall due to thermal expansion of the sensor plate, the lateral edge is located at a predefined minimum distance from the peripheral side wall; and
the cross section of the at least one locating lug is such that over the entire length of the at least one locating lug the respective one of the at least two locating recesses permits a free movement of the at least one locating lug in the direction perpendicular to the major surface of the sensor device and away from the sensor plate.

6. The deposition device according to claim 5, wherein the at least one locating lug includes a uniform cross-section over the entire length of the at least one locating lug such that the respective locating recess permits the local movement of the sensor plate within a uniform separation distance between the locating recess and the respective locating lug in all directions in the planar extension thereof.

7. The deposition device according to claim 5, wherein the cross section of the at least one locating lug is such that over the entire length of the at least one locating lug the respective one of the at least two locating recesses permits a free movement of the at least one locating lug in the direction perpendicular to the major surface of the sensor device and away from the sensor plate.

8. The deposition device according to claim 5, wherein each of the at least two locating recesses has one of a circular and a cylindrical cross section.

9. The deposition device according to claim 5, wherein the sensor plate further includes a baseplate and the at least one detection sublayer is formed as a pressure-sensitive detection sublayer integrated in the sensor plate.

10. The deposition device according to claim 9, wherein the sensor plate further includes at least two pressure-sensitive detection sublayers integrated in the base plate, and at least one slit extends from a lateral edge of the base plate over more than half of a portion of the sensor plate that is located between detection sublayers.

11. The deposition device according to claim 9, wherein the sensor plate is constructed from a support plate disposed beneath the base plate, and the at least two locating recesses are defined by the sensor plate, and the at least one locating lug only extends inside the sensor plate.

12. The deposition device according to claim 11, wherein the at least two locating recesses are only formed in the sensor plate, and the at least one locating lug only extends inside a respective one of the at least two locating recesses.

13. The deposition device according to claim 11, wherein the support plate is of rigid construction.

14. The deposition device according to claim 9, wherein the sensor plate further includes at least two pressure-sensitive detection sublayers and each of the pressure-sensitive detection sublayers has two interlocking, crenellated foils which are positioned in the respective detection sublayer to ensure that the sublayers are electrically connected as a capacitor.

15. The deposition device according to claim 5, further comprising a covering device that covers the sensor plate, the covering device being disposed on at least one of the sensor plate and an upper edge surface of the peripheral side wall.

16. The deposition device according to claim 15, wherein the covering device is formed as at least one of a covering film and a flexible cover plate.

17. The deposition device according to claim 5, wherein the containing device further includes a support plate that extends around an inner surface of the peripheral side wall, and the base plate is supported by the support plate.

18. The deposition device according to claim 5, wherein the containing device and the base plate are formed as a single unit.

19. The deposition device according to claim 5, wherein the at least one passthrough opening is defined by an edge recess on one edge section of the peripheral side wall.

20. The deposition device according to claim 5, wherein the at least one passthrough opening is defined by a window recess in the peripheral side wall.

21. The deposition device according to claim 5, wherein the at least one passthrough opening is defined by an edge recess on an edge portion of the base plate.

\* \* \* \* \*